US008659782B2

(12) United States Patent
Yamagami et al.

(10) Patent No.: US 8,659,782 B2
(45) Date of Patent: Feb. 25, 2014

(54) IMAGE FORMING APPARATUS USING OPTION CONTROLLER FOR PRINTING

(75) Inventors: Hiromi Yamagami, Osaka (JP); Katsuji Furushige, Osaka (JP)

(73) Assignee: KYOCERA Document Solutions Inc. (JP)

( * ) Notice: Subject to any disclaimer, the term of this patent is extended or adjusted under 35 U.S.C. 154(b) by 89 days.

(21) Appl. No.: 13/474,945

(22) Filed: May 18, 2012

(65) Prior Publication Data

US 2012/0293838 A1  Nov. 22, 2012

(30) Foreign Application Priority Data

| May 18, 2011 | (JP) | 2011-110991 |
| May 18, 2011 | (JP) | 2011-110992 |
| May 18, 2011 | (JP) | 2011-110993 |
| Jun. 20, 2011 | (JP) | 2011-136525 |

(51) Int. Cl.
G06F 15/00 (2006.01)
G06F 3/12 (2006.01)
G06K 1/00 (2006.01)

(52) U.S. Cl.
USPC ........................................ 358/1.15; 358/1.13

(58) Field of Classification Search
None
See application file for complete search history.

(56) References Cited

U.S. PATENT DOCUMENTS

| 2002/0196459 A1 | 12/2002 | Kadowaki |
| 2006/0238796 A1 | 10/2006 | Kadowaki |
| 2008/0025748 A1 | 1/2008 | Ogino et al. |
| 2008/0204798 A1* | 8/2008 | Taniguchi et al. ........... 358/1.15 |
| 2011/0279856 A1* | 11/2011 | Yamazaki .................... 358/1.15 |

FOREIGN PATENT DOCUMENTS

| JP | 09-321920 | 12/1997 |
| JP | 2002-192812 | 7/2002 |
| JP | 2003-072198 | 3/2003 |
| JP | 2004-005029 | 1/2004 |
| JP | 2005-186625 | 7/2005 |
| JP | 2008-030456 | 2/2008 |
| JP | 2008-126642 | 6/2008 |

* cited by examiner

Primary Examiner — Douglas Tran
(74) Attorney, Agent, or Firm — McDonnell Boehnen Hulbert & Berghoff LLP (57) ABSTRACT

An image forming apparatus includes a print engine configured to print an image based on raster image data, a main controller configured to execute a process that depends on the print engine, and a relay unit configured to receive the raster image data from an option controller that generates the raster image data, store the raster image data in a memory, receive a control command based on a result of the process that depends on the print engine from the main controller, read the raster image data from the memory in accordance with the control command, and supply the read raster image data to the print engine.

20 Claims, 6 Drawing Sheets

IMAGE FORMING APPARATUS USING OPTION CONTROLLER FOR PRINTING

REFERENCE TO RELATED APPLICATIONS

This application is based upon and claims the benefit of priority from the corresponding Japanese Patent Application No. 2011-110991, filed in the Japan Patent Office on May 18, 2011, No. 2011-110992, filed in the Japan Patent Office on May 18, 2011, No. 2011-110993, filed in the Japan Patent Office on May 18, 2011, and No. 2011-136525, filed in the Japan Patent Office on Jun. 20, 2011, the entire contents of each which are incorporated herein by reference.

BACKGROUND

1. Technical Field

The present disclosure relates to an image forming apparatus for printing an image based on image data transmitted from an option controller.

2. Description of the Related Art

A typical image forming apparatus such as a multifunction peripheral (MFP) includes a controller for controlling a print engine. One of the technologies used in such an image forming apparatus includes connecting an external controller to the image forming apparatus and executing a print job by generating an image signal in the external controller and supplying the image signal to the print engine of the image forming apparatus.

In that technology, a signal converting unit is provided between the external controller and the print engine, for performing a conversion of an electrical signal between the external controller and the print engine.

That is, in the above-mentioned technology, a format of the electrical signal is simply converted. Therefore, it is necessary for the external controller to perform a process that depends on the print engine. As the specification of the print engine varies depending on the model of the image forming apparatus, an option controller such as the external controller needs to be designed for each type of the print engine.

SUMMARY

An image forming apparatus according to the present disclosure includes a print engine, a main controller, and a relay unit. The print engine is configured to print an image based on raster image data. The main controller is configured to execute a process that depends on the print engine. The relay unit is configured to: receive the raster image data from an option controller that generates the raster image data; store the raster image data in a memory; receive a control command based on a result of the process that depends on the print engine from the main controller; read the raster image data from the memory in accordance with the control command; and supply the read raster image data to the print engine.

An image forming method according to the present disclosure includes: (i) printing, via a print engine, an image based on raster image data; (ii) executing, via a main controller, a process that depends on the print engine; and (iii) via a relay unit, receiving the raster image data from an option controller that generates the raster image data, storing the raster image data in a memory, receiving a control command based on a result of the process that depends on the print engine from the main controller, reading the raster image data from the memory in accordance with the control command, and supplying the read raster image data to the print engine.

A non-transitory computer-readable recording medium according to the present disclosure has stored therein an image forming program to be executed in a computer of an image forming apparatus. The image forming program includes a first program code, a second program code, and a third program code. The first program code causes the computer to print an image based on raster image data. The second program code causes the computer to execute a process that depends on a print engine. The third program code causes the computer to: receive the raster image data from an option controller that generates the raster image data; store the raster image data in a memory; read the raster image data from the memory in accordance with a control command based on a result of the process that depends on the print engine; and supply the read raster image data to the print engine.

Additional features and advantages are described herein, and will be apparent from the following Detailed Description and the figures.

DETAILED DESCRIPTION

Exemplary embodiments of the present disclosure are described in detail below with reference to the accompanying drawings.

First Embodiment

Figure 1:
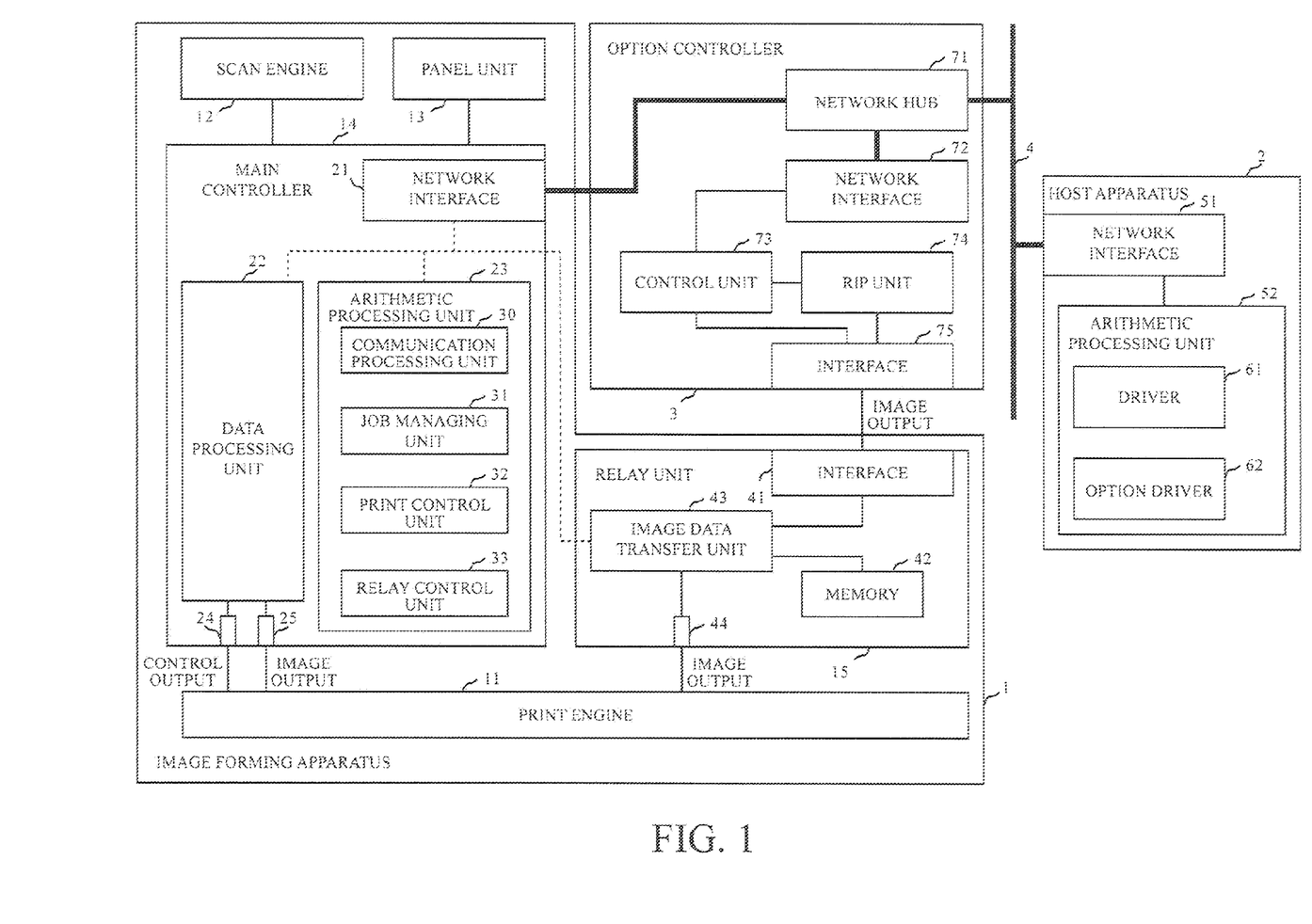
FIG. 1 shows a configuration of an image forming system according to a first embodiment of the present disclosure.

FIG. 1 shows a block diagram illustrating a configuration of an image forming system according to a first embodiment of the present disclosure.

The image forming system illustrated in FIG. 1 includes image forming apparatus 1, host apparatus 2, and option controller 3. Image forming apparatus 1 is an apparatus having at least a print function, such as a printer or a multifunction peripheral (MFP). Host apparatus 2 is a terminal apparatus such as a personal computer in which drivers for image forming apparatus 1 and option controller 3 are installed. Option controller 3 is a device for generating raster image data based on a print request addressed to option controller 3. Network 4 is a computer network such as an office local area network (LAN).

Image forming apparatus 1 is connected to option controller 3, and option controller 3 is connected to network 4. Host apparatus 2 is also connected to network 4. Image forming apparatus 1 is connected to network 4 via network hub 71 included in option controller 3. As a result, image forming apparatus 1, host apparatus 2, and option controller 3 reside on same network. A main controller (described below) of image forming apparatus 1 and option controller 3 are connected to each other with a network signal line.

Image forming apparatus 1 illustrated in FIG. 1 includes print engine 11, scan engine 12, panel unit 13, and main controller 14. Image forming apparatus 1 further includes relay unit 15.

Print engine 11 performs a print process of an image based on the raster image data. Print engine 11 performs the print process of the image by performing a process such as a screening process on the raster image data and controlling a print process mechanism based on the processed data. For example, an electrophotographic type print mechanism forms a latent image on a photosensitive drum with an exposing unit, develops the latent image with a developing unit using a toner, transfers the developed toner image onto a print medium in a direct or indirect manner with a transfer unit, and fixes the transferred toner image onto the print medium with a fixing unit.

Scan engine 12 controls an image reading mechanism to generate image data by reading an original image in an optical manner.

Panel unit 13 includes a display unit and an input unit, thus functioning as a user interface. For example, panel unit 13 includes a liquid crystal display as the display unit and a touch panel as the input unit.

Main controller 14 controls internal devices such as print engine 11, scan engine 12, panel unit 13, and performs various types of data processing. For example, main controller 14 outputs the raster image data and a control command corresponding to the raster image data to print engine 11. Further, main controller 14 receives control information from option controller 3 via a network using network interface 21. Still further, main controller 14 is connected to relay unit 15 via an internal bus. Main controller 14 further controls relay unit 15 based on the control information via the internal bus.

Main controller 14 includes network interface 21, data processing unit 22, arithmetic processing unit 23, control interface 24, and image interface 25.

Network interface 21 is a data communication unit complying with a specific standard such as the Ethernet. Network interface 21 is connected to option controller 3.

Data processing unit 22 acquires the image data from scan engine 12, outputs the image data to print engine 11, and performs various types of data processing on the image data. Data processing unit 22 is built in, for example, an application specific integrated circuit (ASIC).

Arithmetic processing unit 23 is a computer including a central processing unit (CPU) or the like. Arithmetic processing unit 23 implements various processing units by loading corresponding programs from a memory unit such as a read only memory (ROM) to a random access memory (RAM) and running the programs. Arithmetic processing unit 23 includes communication processing unit 30, job managing unit 31, print control unit 32, and relay control unit 33.

Communication processing unit 30 performs a network communication using an upper-level protocol using network interface 21. In the first embodiment, communication processing unit 30 is assigned a unique and fixed Internet Protocol version 6 (IPv6) address, and performs a peer to peer (P2P) network communication using the IPv6 to/from option controller 3. Communication processing unit 30 may also be assigned an IPv4 address to perform a network communication using the IPv4 to/from host apparatus 2. At the time of start-up, communication processing unit 30 reads, from relay unit 15, a network identifier of option controller 3 that has been output from option controller 3 to relay unit 15. After that communication processing unit 30 notifies its own network identifier (in this case, the IPv6 address) to option controller 3 to set up a state in which a network communication to/from option controller 3 can be established. Communication processing unit 30 reads the network identifier of option controller 3 via an internal bus used to control relay unit 15 by relay control unit 33 and via image data transfer unit 43.

Job managing unit 31 receives job requests from host apparatus 2 and option controller 3, and performs jobs corresponding to the received job requests in a sequential manner.

Print control unit 32 controls data processing unit 22 to output the control command and the raster image data to print engine 11. For example, for a copy job, print control unit 32 controls data processing unit 22 to acquire the raster image data from scan engine 12 and to perform a necessary image processing on the raster image data. After that, print control unit 32 controls data processing unit 22 to output the processed raster image data to print engine 11.

Relay control unit 33 supplies the control command corresponding to the control information received from option controller 3 via network interface 21 to image data transfer unit 43 of relay unit 15 via the internal bus. With this configuration, relay control unit 33 causes image data transfer unit 43 to output the raster image data. Further, relay control unit 33 generates the control command corresponding to the raster image data supplied from relay unit 15 to print engine 11 from the control information, and outputs the control command to print engine 11 via data processing unit 22 and control interface 24.

If a print error such as a paper jam, a paper feed delay, or a paper error occurs, relay control unit 33 receives a notification of an occurrence of the print error (including an error type) from print engine 11 via control interface 24 and data processing unit 22, and supplies a control command for performing a print error process in response to the print error (such as termination of output of the raster image data) to image data transfer unit 43. Further, upon completion of a recovery from the print error, relay control unit 33 receives a notification of the recovery from the print error from print engine 11 via control interface 24 and data processing unit 22, performs a print error process in response to the recovery from the print error, and supplies a control command for resuming the output of the raster image data to the image data transfer unit 43.

Relay control unit 33 performs a process that depends on print engine 11, and outputs a control command based on a result of the process to image data transfer unit 43. The process that depends on print engine 11 includes, for example, a page handling process when performing a double-sided print process, a page handling process when performing a multiple-copy print process, a page handling process when using a finisher, and a print error process. In the page handling process when performing the double-sided print process, processes including a reversed order output of the raster image data (page reverse) and insertion of a dummy blank page are performed. In the page handling process when performing the multiple-copy print process, processes including a repeated output of the raster image data and the like are performed. In the page handling process when using the finisher, processes including change of a page order in accordance with an operation mode such as stapling or automatic folding and the like are performed.

Relay control unit 33 then performs the reversed order output of the raster image data (page reverse), the insertion of the dummy blank page, the repeated output of the raster image data when performing the multiple-copy print process, and the change of the page order in accordance with settings of the double-sided print process, settings the number of copies, and settings of the finisher.

Further, relay control unit 33 supplies the control command to image data transfer unit 43 in response to the print error and the recovery from the print error, to cause image data transfer unit 43 to terminate or to resume the output of the raster image data.

Control interface 24 of main controller 14 is an interface for transmitting the control command between main controller 14 and print engine 11. Image interface 25 is an interface for transmitting the image data between main controller 14 and print engine 11.

Relay unit 15 connected to main controller 14 includes interface 41 for connecting to option controller 3, memory 42 for temporarily storing the raster image data, image data transfer unit 43, and image interface 44.

Memory 42 stores therein the raster image data received from option controller 3 via interface 41. Memory 42 has enough capacity to store the raster image data of a specific number of pages.

Image data transfer unit 43 reads the raster image data from memory 42 based on the control command from relay control unit 33, and outputs the read raster image data to print engine 11. Image data transfer unit 43 is built in, for example, a field-programmable gate array (FPGA). When the network identifier of option controller 3 is received via interface 41, image data transfer unit 43 stores the network identifier of option controller 3 in memory 42.

Image interface 44 is an interface for transmitting the image data between relay unit 15 and print engine 11.

Host apparatus 2 illustrated in FIG. 1 includes network interface 51 and arithmetic processing unit 52.

Network interface 51 is a data communication unit connected to network 4 and complying with a specific standard such as Ethernet.

Arithmetic processing unit 52 is a computer including a CPU and implements various processing units by loading corresponding programs from a memory unit such as a ROM to a RAM and running the programs. Arithmetic processing unit 52 includes driver 61 and option driver 62.

Driver 61 is a driver for image forming apparatus 1, for controlling image forming apparatus 1 in a remote manner. Option driver 62 is a driver for option controller 3, for transmitting the print request to option controller 3.

Option controller 3 illustrated in FIG. 1 includes network hub 71, network interface 72, control unit 73, raster image processor (RIP) unit 74, and interface 75.

Network hub 71 is connected to network 4 that is externally provided and to image forming apparatus 1 that is also externally provided. Network interface 72 is a data communication unit connected to network hub 71 and complying with a specific standard such as the Ethernet.

Control unit 73 performs a network communication using an upper-level protocol by using network interface 72. Control unit 73 is assigned a unique and fixed Internet Protocol version 6 (IPv6) address, and performs a peer to peer (P2P) network communication using the IPv6 to/from main controller 14. Control unit 73 may also be assigned an IPv4 address to perform a network communication using the IPv4 to/from host apparatus 2. At the time of starting option controller 3, control unit 73 outputs the IPv6 address to relay unit 15 via interface 75. The IPv6 address is a network identifier that is used in a network communication to/from main controller 14.

Control unit 73 receives a print request (page description language (PDL) data) via network interface 72, extracts control information from the print request, and causes the RIP unit 74 to generate raster image data from the print request. Control unit 73 transmits the extracted control information to image forming apparatus 1 via network interface 72 as a job request. The control information includes, for example, settings of a double-sided print process (whether the print job is a double-sided print process or a single-sided print process), settings of a combined print process (settings regarding the number of original pages to be printed on one page of the print medium), settings of a finisher, and settings of a paper feeding source and a paper discharge destination.

RIP unit 74 generates raster image data from the print request. Interface 75 outputs the raster image data generated by RIP unit 74.

Figure 2:
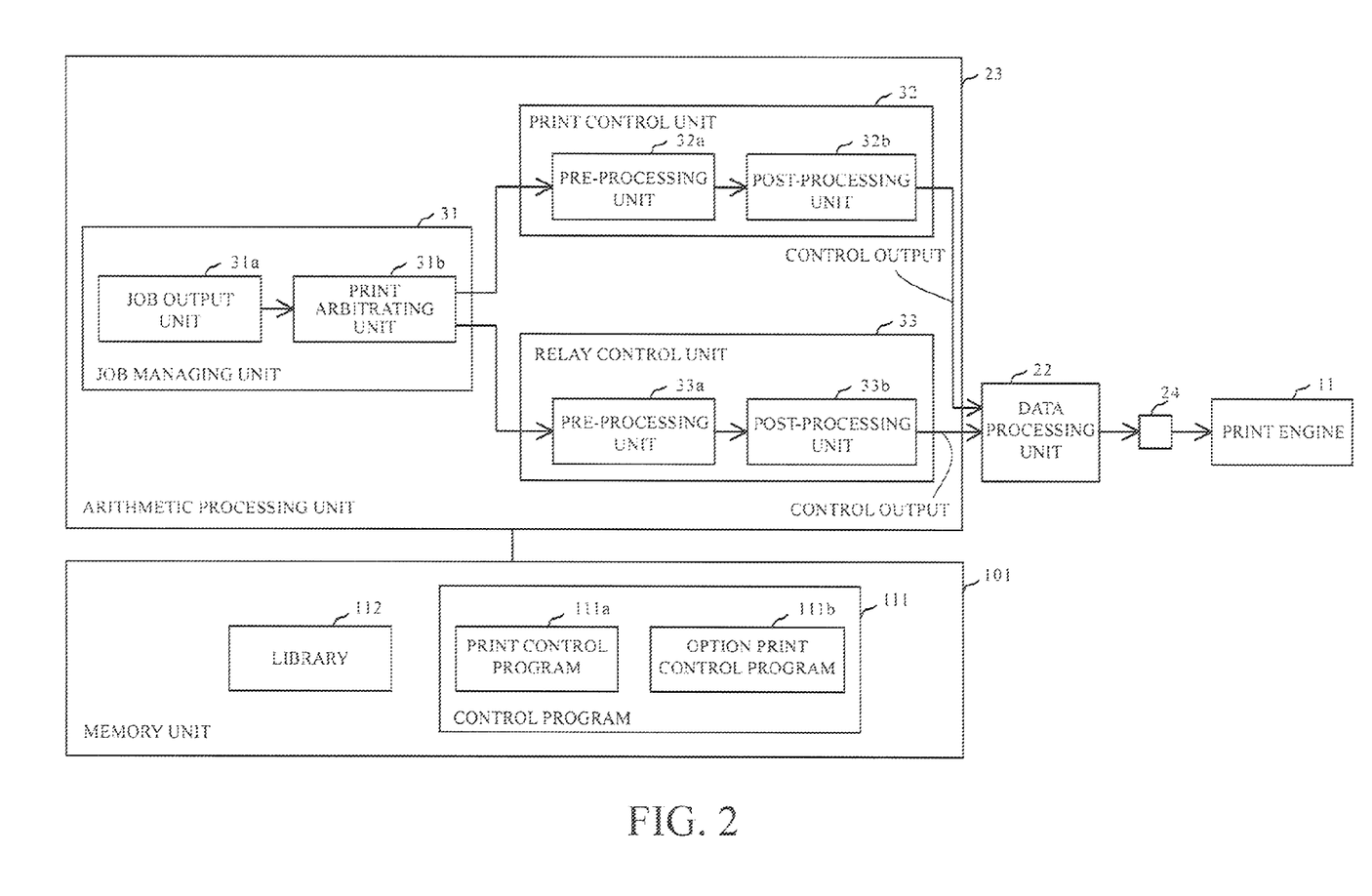
FIG. 2 shows a configuration of an arithmetic processing unit of a main controller.

Job managing unit 31, print control unit 32, and relay control unit 33 of image forming apparatus 1 are described in detail below. FIG. 2 shows a block diagram illustrating a configuration of the arithmetic processing unit of the main controller.

Job managing unit 31 includes job output unit 31a and print arbitrating unit 31b. Job output unit 31a receives a print request (print request such as a print process at the time of copying, a print process of a document received via a facsimile, or a box print process) generated in image forming apparatus 1 (i.e., in a unit other than option controller 3) and a print request generated in option controller 3. Job output unit 31a outputs a job corresponding to the print request to print arbitrating unit 31b. In this case, information regarding the job output from job output unit 31a to print arbitrating unit 31b includes job type information indicating whether the job is based on the print request generated in image forming apparatus 1 or option controller 3. Print arbitrating unit 31b causes print control unit 32 or relay control unit 33 to execute the job depending on a type of the job (i.e., whether the job is based on the print request generated in the image forming apparatus 1 or option controller 3) while establishing exclusive control over print control unit 32 and relay control unit 33 so as not to execute the job at the same time.

Print control unit 32 includes pre-processing unit 32a and post-processing unit 32b.

Pre-processing unit 32a causes data processing unit 22 to specify a page configuration of the job and output a control command to print engine 11 or to perform a print error process, based on the control information. Pre-processing unit 32a causes data processing unit 22 to output the raster image data to print engine 11 in accordance with the page configuration or the print error process, based on the control information. The control command includes information on the page configuration and other commands (such as a specification of the double-sided print process or a specification of the finisher).

For example, if the multiple-copy print process is specified in the control information, the page configuration of the job is specified to print the same page a plurality of times. Specifically, if printing two copies of a two-page document, a page configuration of the first page, the second page, the first page, and the second page or a page configuration of the first page, the first page, the second page, and the second page is specified. In addition, if use of the finisher is specified in the control information, for example, the page configuration is specified in a page order in accordance with an operation mode such as stapling and automatic folding.

Post-processing unit 32b causes data processing unit 22 to perform an output control of the raster image data based on the control information while monitoring a status of print engine 11. For example, if the double-sided print process is specified in the control information, the reversed order output of the raster image data (page reverse) and the insertion of a dummy blank page are performed by post-processing unit 32b. The status information regarding print engine 11 required for a process of post-processing unit 32b is acquired via data processing unit 22 and control interface 24.

Relay control unit 33 includes pre-processing unit 33a and post-processing unit 33b.

Pre-processing unit 33a causes data processing unit 22 to specify a page configuration of the job and output a control command to print engine 11 or to perform a print error process, based on the control information. Pre-processing unit 33a causes image data transfer unit 43 of relay unit 15 to output the raster image data to print engine 11 in accordance with the page configuration or the print error process, based on the control information. The control command includes information on the page configuration and other commands (such as a specification of the double-sided print process or a specification of the finisher).

Post-processing unit 33b causes image data transfer unit 43 of relay unit 15 to perform an output control of the raster image data based on the control information while monitoring a status of print engine 11. For example, if the double-sided print process is specified in the control information, the reversed order output of the raster image data (page reverse) and the insertion of a dummy blank page are performed by post-processing unit 33b. The status information regarding print engine 11 required for a process of post-processing unit 33b is acquired via data processing unit 22 and control interface 24.

Job managing unit 31, print control unit 32, and relay control unit 33 are implemented in arithmetic processing unit 23 when control program 111 stored in memory unit 101 such as a nonvolatile memory or a hard disk is run by arithmetic processing unit 23. Control program 111 includes print control program 111a and option print control program 111b. Print control unit 32 is implemented by running print control program 111a, and relay control unit 33 is implemented by running option print control program 111b. In order to perform the above-mentioned process, option print control program 111b calls library 112 that is shared with print control program 111a.

A print process performed in the image forming system according to the first embodiment is described below.

Network identifier notification at the time of starting the image forming apparatus 1 and the option controller 3 is described first.

At the time of start-up, control unit 73 of option controller 3 outputs the network identifier assigned thereto (in this case, the IPv6 address) to relay unit 15 via interface 75. In relay unit 15, when the network identifier is received at interface 41, image data transfer unit 43 stores the network identifier in memory 42.

Communication processing unit 30 of main controller 14 transmits a control command for transmitting the network identifier of option controller 3 to image data transfer unit 43 of relay unit 15 via an internal bus. Upon receiving the control command, image data transfer unit 43 of relay unit 15 reads the network identifier of option controller 3 from memory 42 and transmits the network identifier to communication processing unit 30 of main controller 14 via the internal bus. Communication processing unit 30 of main controller 14 receives the network identifier of option controller 3 from image data transfer unit 43 of relay unit 15, and notifies its own network identifier to option controller 3 based on the network identifier of option controller 3. Upon receiving the notification, control unit 73 of option controller 3 recognizes the network identifier of main controller 14. With this configuration, a network communication can be established between option controller 3 and main controller 14.

In this manner, at the time of start-up (or before the first communication), the network communication can be established between option controller 3 and main controller 14. Therefore, as is described below, option controller 3 can transmit control information on a print request addressed to option controller 3 to main controller 14 via the network (i.e., network interfaces 21 and 72).

Figure 3:
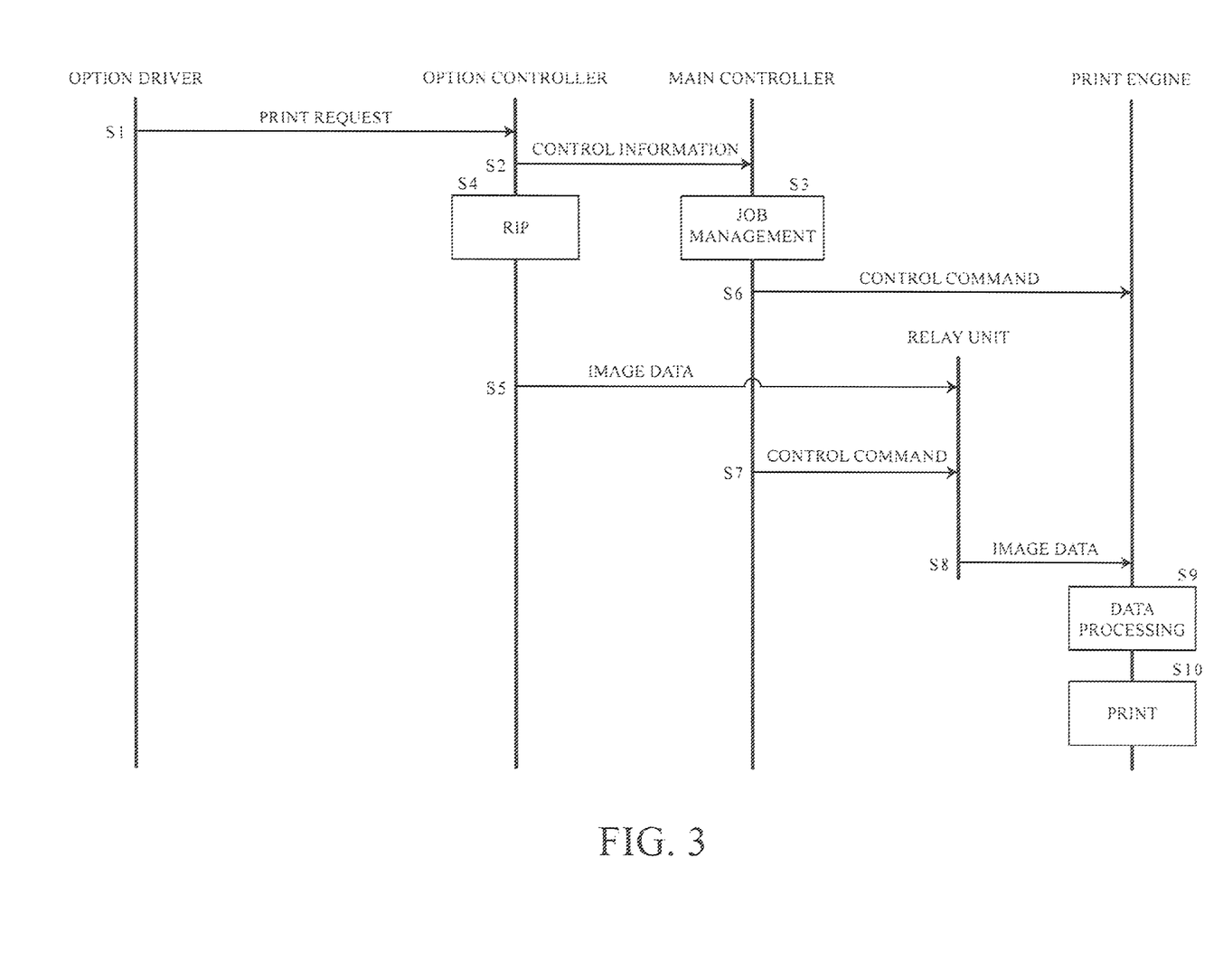
FIG. 3 shows a sequence of a print process according to the first embodiment.

A print process according to the first embodiment is described next. FIG. 3 shows a sequence of the print process according to the first embodiment.

Option driver 62 of host apparatus 2 generates a print request that is PDL data and transmits the print request to option controller 3 via network interface 51 (Step S1). The print request is transferred to network interface 72 of option controller 3 via network hub 71. Control unit 73 receives the print request via network interface 72.

Control unit 73 of option controller 3 extracts the control information from the print request, and transmits the control information regarding the print request to main controller 14 via network interface 72 (Step S2). That is, the control information regarding the print request is transmitted from the option controller 3 to image forming apparatus 1 via the network. The control information includes, for example, settings of the double-sided print process, settings of the combined print process, settings of the finisher, and settings of the paper feeding source and the paper discharge destination.

In image forming apparatus 1, the control information regarding the print request is received via network interface 21 and/or communication processing unit 30, and job managing unit 31 receives the control information as the print request from option controller 3. Job managing unit 31 then manages a job corresponding to the control information (Step S3).

On the other hand, in option controller 3, control unit 73 causes RIP unit 74 to execute a generation of raster image data from the print request (Step S4). The raster image data generated by RIP unit 74 is transmitted to relay unit 15 via interface 75, and is stored in memory 42 of relay unit 15 (Step S5).

When job managing unit 31 starts execution of a job, a job execution notification may be transmitted from job managing unit 31 to control unit 73 via the network. In this case, upon receiving the job execution notification, control unit 73 may cause RIP unit 74 to generate the raster image data and transmit the raster image data to relay unit 15.

In image forming apparatus 1, job managing unit 31 causes relay control unit 33 to execute the job related to the print request from option controller 3. Relay control unit 33 transmits a control command based on the control information received from job managing unit 31 to print engine 11 via data processing unit 22 and control interface 24 (Step S6). After that, relay control unit 33 performs a process based on the control information, and transmits a control command corresponding to a result of the process to image data transfer unit 43 of relay unit 15 (Step S7). Upon receiving the control command, image data transfer unit 43 of relay unit 15 outputs the raster image data stored in memory 42 to print engine 11 via image interface 44 in accordance with the control command (Step S8).

Print engine 11 performs a specific process such as a screening process on the raster image data (Step S9), and controls a print mechanism to perform a print process of an image based on the control command from main controller 14 and the processed data (Step S10).

In this manner, the print process using an option controller is executed.

On the other hand, in a print process based on the print request generated in the image forming apparatus 1, print control unit 32 of main controller 14 controls data processing unit 22 to output the raster image data and the control command to print engine 11. Print engine 11 performs a print process of an image based on the raster image data and the control command.

Figure 4:
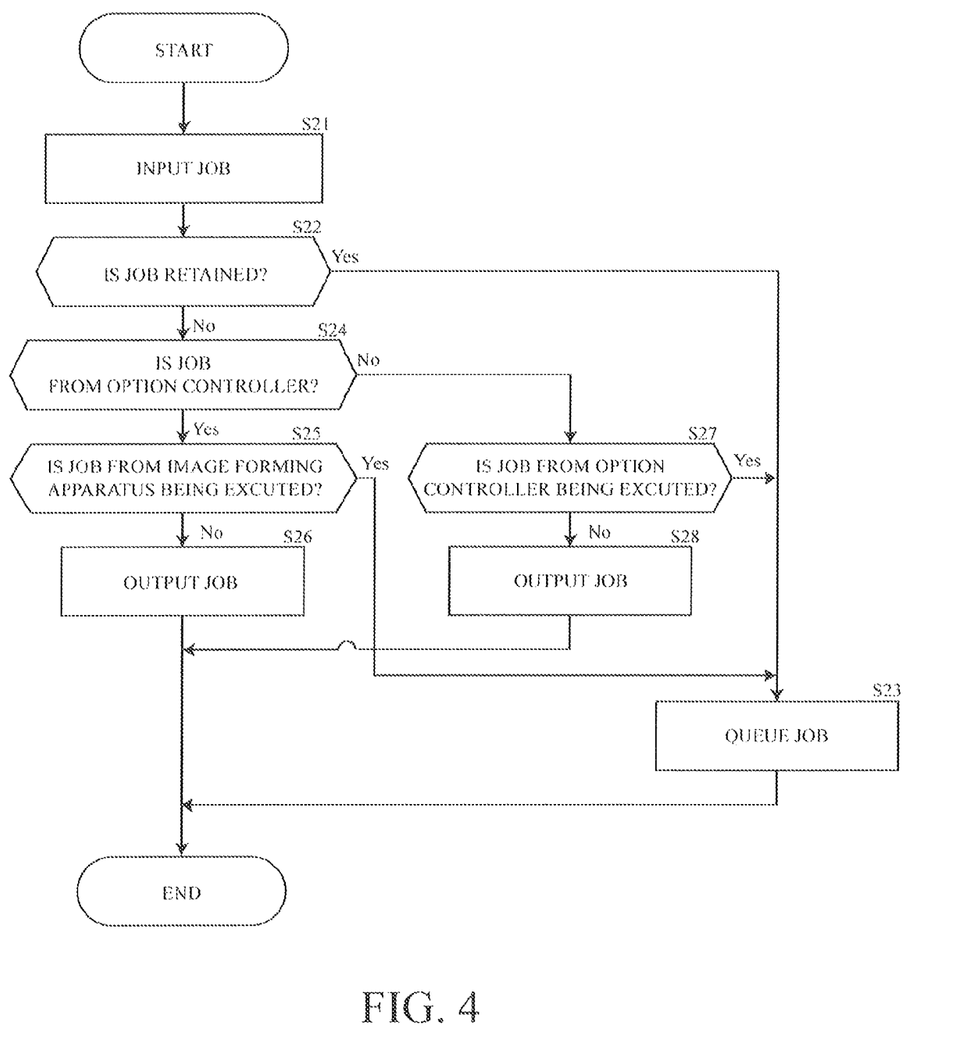
FIG. 4 shows an operation of a print arbitrating unit.

Job management by job managing unit 31 is described below in detail. FIG. 4 shows an operation of print arbitrating unit 31b.

Print arbitrating unit 31b includes a queue of jobs. When an execution of a job is completed at print control unit 32 or relay control unit 33, print arbitrating unit 31b outputs a job at the top of the queue to print control unit 32 or relay control unit 33 to execute the job. At this time, in the case where a processing unit for executing the job is switched from one of print control unit 32 and relay control unit 33 to the other, print arbitrating unit 31b causes post-processing units 32b and 33b of print control unit 32 and relay control unit 33 to reset pieces of status information regarding print engine 11 maintained in post-processing units 32b and 33b, and to re-acquire the status information regarding print engine 11 as appropriate.

When a job is input from job output unit 31a (Step S21), print arbitrating unit 31b determines whether there is a job retained in the queue (Step S22). If there is a job retained in the queue, print arbitrating unit 31b adds the input job to the end of the queue (Step S23).

On the other hand, if there is no job retained in the queue, print arbitrating unit 31b determines whether the input job is based on a print request from option controller 3 (Step S24).

If the input job is a job based on the print request from option controller 3, print arbitrating unit 31b determines whether a job based on a print request generated in image forming apparatus 1 is being executed by print control unit 32 (Step S25).

If the job based on the print request generated in the image forming apparatus 1 is not executed by print control unit 32, print arbitrating unit 31b outputs the input job immediately to relay control unit 33 without queuing the input job, and causes relay control unit 33 to execute the jobs in a sequential manner (Step S26). On the other hand, if the job based on the print request generated in image forming apparatus 1 is being executed by print control unit 32, print arbitrating unit 31b queues the input job (Step S23).

If the input job is not a job based on the print request from option controller 3 in Step S24 (i.e., if the input job is a job based on the print request generated in image forming apparatus 1), print arbitrating unit 31b determines whether a job based on the print request from option controller 3 is being executed by relay control unit 33 (Step S27).

If the job based on the print request from option controller 3 is not executed by relay control unit 33, print arbitrating unit 31b outputs the input job immediately to print control unit 32 without queuing the input job, and causes print control unit 32 to execute the jobs in a sequential manner (Step S28). On the other hand, if the job based on the print request from option controller 3 is being executed by relay control unit 33, print arbitrating unit 31b queues the input job (Step S23).

In this manner, print arbitrating unit 31b of job managing unit 31 establishes exclusive control so that only one of print control unit 32 and relay control unit 33 can use print engine 11.

In the first embodiment, image forming apparatus 1 may further have a facsimile communication function. In this case, when printing a document received via a facsimile, data processing unit 22 converts image data received and stored via the facsimile into raster image data, and outputs the raster image data to print engine 11.

Second Embodiment

Figure 5:
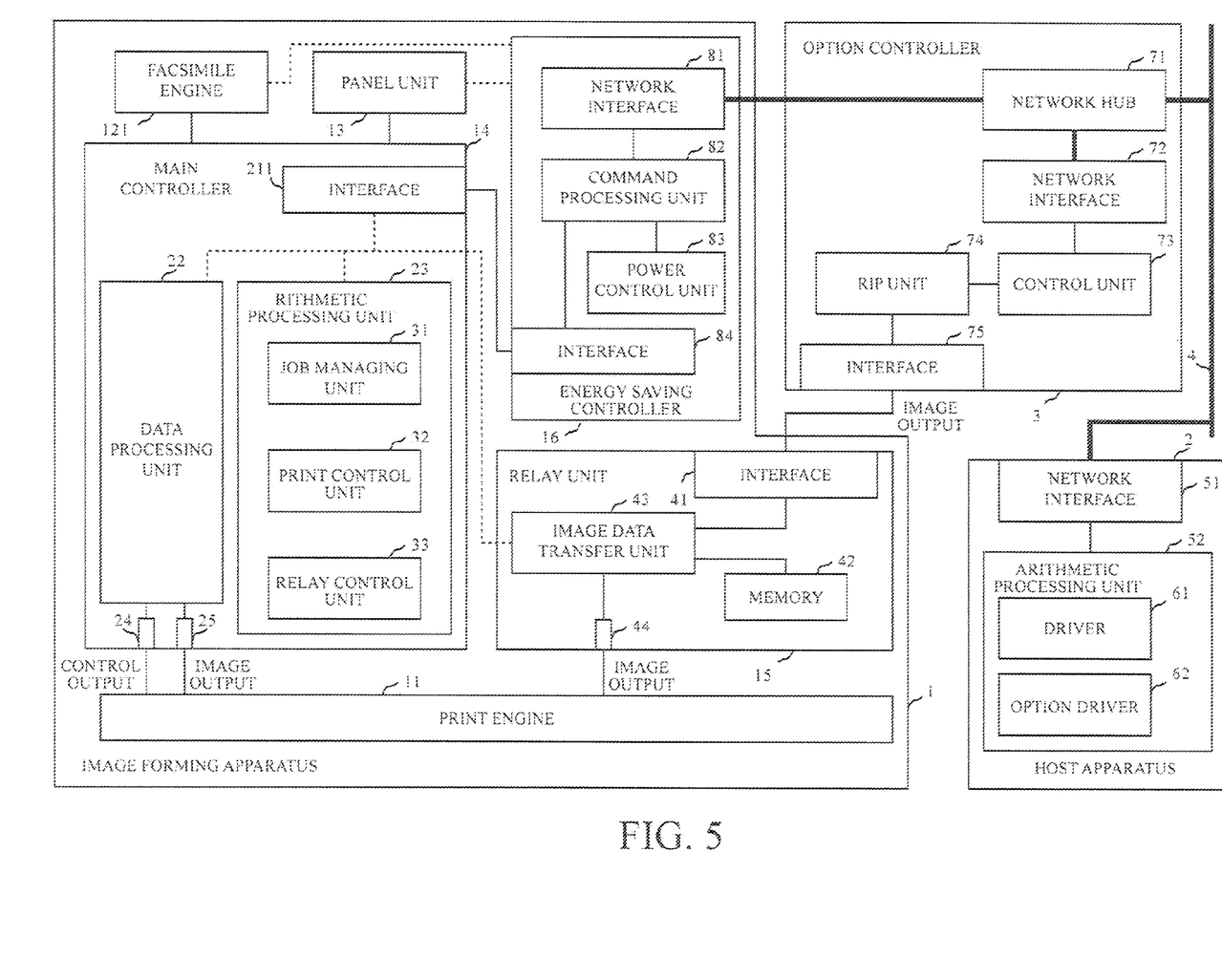
FIG. 5 shows a configuration of an image forming system according to a second embodiment of the present disclosure.

FIG. 5 shows a configuration of an image forming system including an image forming apparatus according to a second embodiment of the present disclosure.

The image forming system illustrated in FIG. 5 includes image forming apparatus 1, host apparatus 2, and an option controller 3 similarly to the first embodiment. Image forming apparatus 1, host apparatus 2, and option controller 3 reside on the same network similarly to the first embodiment.

Image forming apparatus 1 illustrated in FIG. 5 includes print engine 11, facsimile engine 121, panel unit 13, main controller 14, and energy saving controller 16. Image forming apparatus 1 further includes relay unit 15.

Print engine 11 performs a print process of an image based on the raster image data. Configuration, function, and operation of print engine 11 are the same as those of the first embodiment.

Facsimile engine 121 controls a communication unit such as a modem to perform transmission and reception of a facsimile signal, and generates image data of a received document from a received facsimile signal.

Panel unit 13 includes a display unit and an input unit, thus functioning as a user interface similarly to the first embodiment.

Main controller 14 controls internal devices such as print engine 11, facsimile engine 121, and panel unit 13, and performs various types of data processing. For example, main controller 14 outputs the raster image data and a control command corresponding to the raster image data to print engine 11. Still further, main controller 14 is connected to relay unit 15 via an internal bus. For printing with the raster image data generated by option controller 3, main controller 14 further controls relay unit 15 based on the control information via the internal bus.

Main controller 14 includes interface 211, data processing unit 22, arithmetic processing unit 23, control interface 24, and image interface 25.

Interface 211 is an internal interface for performing a data communication to/from energy saving controller 16. A high-speed internal interface such as PCI Express is used as interface 211.

Data processing unit 22 acquires image data obtained from the facsimile signal received by facsimile engine 121. Data processing unit 22 outputs raster image data and a print control command to print engine 11 and performs various types of data processing on the image data. Data processing unit 22 is built in, for example, an application specific integrated circuit (ASIC).

Arithmetic processing unit 23 is a computer including a central processing unit (CPU) or the like. Arithmetic processing unit 23 implements various processing units by loading corresponding programs from a memory unit such as a read only memory (ROM) to a random access memory (RAM) and running the programs. Arithmetic processing unit 23 includes job managing unit 31, print control unit 32, and relay control unit 33.

Job managing unit 31 receives job requests from host apparatus 2 and option controller 3 via energy saving controller 16, and performs jobs corresponding to the received job requests in a sequential manner.

Print control unit 32 controls data processing unit 22 to output the control command and the raster image data to print engine 11. For example, for a copy job, print control unit 32 controls data processing unit 22 to acquire the raster image data from a scan engine (not shown) and to perform a necessary image processing on the raster image data. After that, print control unit 32 controls data processing unit 22 to output the processed raster image data to print engine 11.

Relay control unit 33 receives the control information transmitted from option controller 3 via energy saving controller 16 and interface 211, and supplies a control command corresponding to the control information to image data transfer unit 43 of relay unit 15 via the internal bus. With this configuration, relay control unit 33 causes image data transfer unit 43 to output the raster image data. Further, relay control unit 33 generates, from the control information, a control command corresponding to the raster image data supplied from relay unit 15 to print engine 11, and outputs the control command to print engine 11 via data processing unit 22 and control interface 24.

If a print error occurs, when restoring from the print error, or when performing a process that depends on print engine 11, relay control unit 33 operates in the same manner as in the first embodiment. Relay control unit 33 operates in the same manner as in the first embodiment in accordance with settings of the double-sided print process, settings of the multiple-copy print process, or settings of the finisher or in accordance with the occurrence of a print error and the recovery from the print error.

In the same manner as in the first embodiment, job managing unit 31 includes a job output unit and a print arbitrating unit, print control unit 32 includes a pre-processing unit and a post-processing unit, and relay control unit 33 includes a pre-processing unit and a post-processing unit. Configurations, functions, and operations of these units are the same as those of the first embodiment.

Control interface 24 of main controller 14 is an interface for transmitting the control command between main controller 14 and print engine 11. Image interface 25 is an interface for transmitting the image data between main controller 14 and print engine 11.

Relay unit 15 connected to main controller 14 includes interface 41 for connecting to option controller 3, memory 42 for temporarily storing the raster image data, image data transfer unit 43, and image interface 44. Configuration, function, and operation of relay unit 15 are the same as those of the first embodiment.

Energy saving controller 16 performs a power control of main controller 14. For example, energy saving controller 16 is provided on a separate substrate from main controller 14, and energy saving controller 16 is constantly supplied with power after the start of the apparatus. The energy saving controller 16 includes network interface 81, command processing unit 82, power control unit 83, and interface 84 connected to interface 211 of main controller 14. Command processing unit 82 and power control unit 83 are formed of an ASIC, a computer, and the like.

Network interface 81 is a data communication unit capable of performing a communication to/from option controller 3 and host apparatus 2 via network 4 and complying with a specific standard such as the Ethernet.

Command processing unit 82 receives control information from option controller 3 or host apparatus 2 that has been received by network interface 81 via network 4. If the received control information is information that can be processed by command processing unit 82, command processing unit 82 performs a process for the control information; otherwise, it transfers the control information to main controller 14 via interface 84.

If a power supply to main controller 14 is stopped when control information generated from a print request by option controller 3 is received, command processing unit 82 causes power control unit 83 to resume the power supply to main controller 14. After that, command processing unit 82 transmits the control information generated from the print request to main controller 14 via interface 84. Upon receiving the control information generated from the print request via interface 211, main controller 14 generates a control command from the received control information and supplies the control command to print engine 11, corresponding to the raster image data supplied from relay unit 15 to print engine 11.

Power control unit 83 performs a power control of main controller 14. Power control unit 83 monitors an internal status of image forming apparatus 1, and if a specific condition is met, stops a power supply to a specific internal device such as main controller 14. If a facsimile reception by facsimile engine 121, operation at panel unit 13, a power recovery request from the host apparatus, or a print request from the host apparatus occurs, power control unit 83 resumes the power supply.

Power control unit 83 may further perform a power control of relay unit 15. In this case, if a power supply to relay unit 15 is stopped when the control information generated from the print request by option controller 3 is received, command processing unit 82 causes power control unit 83 to resume the power supply to relay unit 15. After that, command processing unit 82 may transmit the control information generated from the print request to main controller 14 via interface 84. In this case, for example, if a specific condition is met, such as a condition that a print job by option controller 3 does not occur for a specific time period, power control unit 83 may stop the power supply to relay unit 15 regardless of the power supply status of main controller 14.

Host apparatus 2 illustrated in FIG. 5 includes network interface 51 and arithmetic processing unit 52. Configuration, function, and operation of host apparatus 2 are the same as those of the first embodiment.

Option controller 3 illustrated in FIG. 5 includes network hub 71, network interface 72, control unit 73, raster image processor (RIP) unit 74, and interface 75.

Network hub 71 is connected to network 4 that is externally provided and to image forming apparatus 1 that is also externally provided. Network interface 72 is a data communication unit connected to network hub 71 and complying with a specific standard such as the Ethernet.

Configurations, functions, and operations of control unit 73 and RIP unit 74 are the same as those of the first embodiment.

Figure 6:
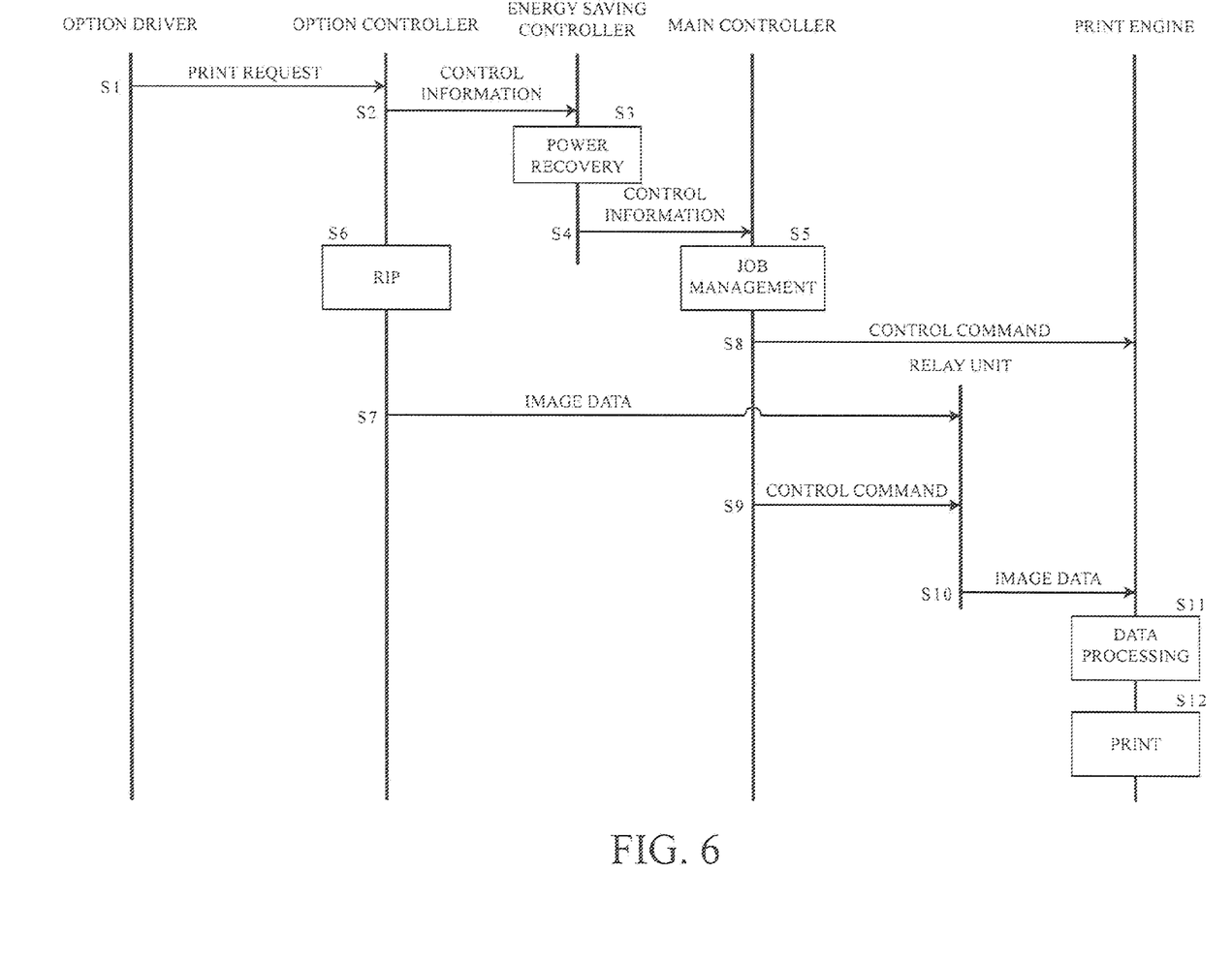
FIG. 6 shows a sequence of a print process according to the second embodiment.

A print process according to the second embodiment is described next. FIG. 6 shows a sequence of the print process according to the second embodiment.

Option driver 62 of host apparatus 2 generates a print request that is PDL data and transmits the print request to option controller 3 via network interface 51 (Step S1). The print request is transferred to network interface 72 of option controller 3 via network hub 71. Control unit 73 receives the print request via network interface 72.

Control unit 73 of option controller 3 extracts the control information from the print request, and transmits the control information regarding the print request to energy saving controller 16 of image forming apparatus 1 via network interface 72 (Step S2). That is, the control information regarding the print request is transmitted from option controller 3 to image forming apparatus 1 via the network. The control information includes, for example, settings of the double-sided print process, settings of the combined print process, settings of the finisher, and settings of the paper feeding source and the paper discharge destination.

In energy saving controller 16 of image forming apparatus 1, the control information regarding the print request is received via network interface 81, and when the control information regarding the print request is received, command processing unit 82 determines that the control information cannot be processed in command processing unit 82.

Command processing unit 82 checks whether the power supply to main controller 14 is stopped by the power control unit 83, and if the power supply to main controller 14 is stopped, causes power control unit 83 to resume the power supply to main controller 14 (Step S3). After that, power control unit 83 transfers the control information to main controller 14 via interface 84 (Step S4).

In main controller 14, when the control information is received via interface 211, job managing unit 31 receives the control information as the print request from option controller 3. Job managing unit 31 then manages a job corresponding to the control information (Step S5).

On the other hand, in option controller 3, control unit 73 causes RIP unit 74 to execute a generation of raster image data from the print request (Step S6). The raster image data generated by RIP unit 74 is transmitted to relay unit 15 via interface 75, and is stored in memory 42 of relay unit 15 (Step S7).

If the power supply to relay unit 15 is stopped when the print request occurs, the power supply to relay unit 15 is also resumed when the power supply to main controller 14 is resumed. Therefore, after checking that relay unit 15 is operating via interface 75, control unit 73 of option controller 3 generates the raster image data and outputs the raster image data to relay unit 15.

When job managing unit 31 starts execution of a job, a job execution notification may be transmitted from job managing unit 31 to control unit 73 of option controller 3 via energy saving controller 16 and the network. In this case, upon receiving the job execution notification, control unit 73 may cause RIP unit 74 to generate the raster image data and transmit the raster image data to relay unit 15.

In image forming apparatus 1, job managing unit 31 causes relay control unit 33 to execute the job related to the print request from option controller 3. Relay control unit 33 transmits a control command based on the control information received from job managing unit 31 to print engine 11 via data processing unit 22 and control interface 24 (Step S8). After that, relay control unit 33 performs a process based on the control information, and transmits a control command corresponding to a result of the process to image data transfer unit 43 of relay unit 15 (Step S9). Upon receiving the control command, image data transfer unit 43 of relay unit 15 outputs the raster image data stored in memory 42 to print engine 11 via image interface 44 in accordance with the control command (Step S10).

Print engine 11 performs a specific process such as a screening process on the raster image data (Step S11), and controls a print mechanism to perform a print process of an image based on the control command from main controller 14 and the processed data (Step S12).

In the second embodiment, when printing a document received via a facsimile, data processing unit 22 may convert image data received and stored via the facsimile into raster image data, and output the raster image data to print engine 11.

Other Embodiments

The present disclosure is not limited to the above-mentioned embodiments, but various modifications may be made thereto within the scope of the invention.

For example, in the above-mentioned embodiments, option controller 3 is a separate external controller from image forming apparatus 1, but option controller 3 can be built in image forming apparatus 1. If option controller 3 is built in image forming apparatus 1, image forming apparatus 1 can be connected to network 4 with a single cable. In this case, image forming apparatus 1 has two network identifiers (for example, the above-mentioned IPv6 addresses).

Further, in the above-mentioned embodiments, a web server may be provided in control unit 73 of option controller 3 and a web browser may be provided in arithmetic processing unit 23 of main controller 14 so that screen data (such as web page data) is obtained from the web server of control unit 73 with the web browser, and a control screen of option controller 3 is displayed on panel unit 13 based on the screen data.

Still further, in the above-mentioned embodiments, a document box function may be provided in image forming apparatus 1. In this case, data processing unit 22 converts image data stored in a document box into raster image data at the time of a box print process, and the raster image data is output to print engine 11.

Still further, in the above-mentioned embodiments, a media access control (MAC) address of network interface 72 may be output from option controller 3 to relay unit 15 as the network identifier. In this case, main controller 14 may read the MAC address of option controller 3 from relay unit 15 and identify an IP address of option controller 3 by using a reverse address resolution protocol (RARP).

When canceling a job, job output unit 31a may output a cancel request to print arbitrating unit 31b. If the job specified by the cancel request is a job retained in the queue, the print arbitrating unit 31b may delete the job from the queue and output a cancel completion notification to job output unit 31a. When canceling the whole jobs, print arbitrating unit 31b may delete all jobs in the queue and cause print control unit 32 and relay control unit 33 to stop jobs that are being executed.

As described above, according to the above-mentioned embodiments, the process that depends on the print engine is executed in the main controller when performing a print process of an image using the option controller, and hence it is not necessary to design the option controller for each type of the print engine. Therefore, all it takes is to adjust a control in the main controller to be suitable for the print engine, and hence a development load for a system for using the option controller is reduced. In addition, for development of a plurality of types of image forming apparatus, the same option controller can be used in the plurality of types of image forming apparatus with only changing the main controller.

Further, the main controller acquires the network identifier of the option controller via the relay unit, and hence a network communication can be established between the option controller 3 and the main controller by notifying the network identifier without providing a dedicated line other than the signal line of the network between the main controller and the option controller.

Still further, the control signal from the option controller is received by using a network interface through which a communication can be established with the host apparatus, and hence it is not necessary to provide another signal line for power control in order to perform the power control of the image forming apparatus based on the control information from the option controller, thus leading to a cost decrease of the image forming apparatus.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
   a print engine configured to print an image based on raster image data;
   a main controller configured to execute a process that depends on the print engine; and
   a relay unit configured to:
      receive the raster image data from an option controller that generates the raster image data;
      store the raster image data in a memory;
      receive a control command based on a result of the process that depends on the print engine from the main controller;
      read the raster image data from the memory in accordance with the control command; and
      supply the read raster image data to the print engine.

2. The image forming apparatus according to claim 1, wherein:
   the option controller is configured to generate the raster image data and control information corresponding to a print request; and
   the main controller is further configured to:
      receive the control information from the option controller via a network interface;
      generate the control command, from the control information, corresponding to the raster image data supplied from the relay unit to the print engine; and
      supply the control command to the print engine.

3. The image forming apparatus according to claim 2, wherein the main controller is connected to the relay unit with an internal bus, and is further configured to control the relay unit based on the control information via the internal bus.

4. The image forming apparatus according to claim 1, further comprising an energy-saving controller that includes a network interface for communicating to/from the option controller and a host apparatus via a network and is configured to perform a power control of the main controller based on control information received from the option controller via the network interface.

5. The image forming apparatus according to claim 4, wherein:
   the energy-saving controller further includes:
      a power control unit configured to perform the power control of the main controller;
      an interface configured to perform data communication with the main controller; and
      a command processing unit configured to:
         receive the control information from the option controller or the host apparatus that is received by the network interface via the network;
         cause the power control unit to start a power supply to the main controller in a case where the power supply to the main controller is stopped when control information generated from a print request by the option controller is received; and
         subsequently transmit the control information generated from the print request to the main controller via the interface; and
   upon receiving the control information generated from the print request, the main controller is further configured to generate the control command, from the received control information, corresponding to the raster image data supplied from the relay unit to the print engine and supply the control command to the print engine.

6. The image forming apparatus according to claim 5, wherein the main controller is connected to the relay unit with an internal bus, and is further configured to control the relay unit based on the control information via the internal bus.

7. The image forming apparatus according to claim 5, wherein:
   the power control unit further performs a power control of the relay unit; and
   in a case where a power supply to the relay unit is stopped when the control information generated from the print request by the option controller is received, the command processing unit is further configured to cause the power control unit to start the power supply to the relay unit.

8. The image forming apparatus according to claim 1, wherein:
   the relay unit is further configured to:
      receive the raster image data corresponding to a print request generated by the option controller from the option controller;
      store the raster image data in the memory;
      read the raster image data from the memory; and
      output the raster image data to the print engine; and
   the main controller includes:
      a print control unit configured to output raster image data corresponding to a print request generated by a unit in the image forming apparatus and other than the option controller and a control command corresponding to the raster image data to the print engine;
      a relay control unit configured to control the relay unit to output the raster image data from the relay unit to the print engine; and
      a print arbitrating unit configured to, when the print request generated by the unit in the image forming apparatus and other than the option controller and the print request generated in the option controller conflict with each other, establish exclusive control over the print control unit and the relay control unit.

9. The image forming apparatus according to claim 8, wherein the print control unit is configured to call a library that is shared with the relay control unit in operation.

10. The image forming apparatus according to claim 8, wherein:
    the option controller is configured to generate the raster image data and control information corresponding to a print request;
    the main controller is further configured to receive the control information from the option controller via a network interface; and
    the relay control unit is further configured to:
       generate the control command, from the control information, corresponding to the raster image data supplied from the relay unit to the print engine; and
       output the control command to the print engine.

11. The image forming apparatus according to claim 8, wherein:
    the main controller is connected to the relay unit with an internal bus; and the relay control unit is further configured to control the relay unit based on the control information via the internal bus.

12. The image forming apparatus according to claim 1, wherein:
the option controller is configured to output raster image data and control information corresponding to a print request;
the main controller is further configured to:
receive the control information from the option controller via a network; and
supply a control command based on the control information to the print engine;
the option controller is assigned a unique network identifier and configured to output the unique network identifier of the option controller to the relay unit;
the relay unit is further configured to store therein the unique network identifier of the option controller; and
the main controller is assigned a unique network identifier and further configured to read the unique network identifier of the option controller from the relay unit to establish a network communication with the option controller.

13. The image forming apparatus according to claim 12, wherein the option controller is further configured to output the unique network identifier to the relay unit by using an interface for outputting the raster image data.

14. The image forming apparatus according to claim 12, wherein the main controller is connected to the relay unit with an internal bus, and is further configured to:
control the relay unit based on the control information via the internal bus; and
read the unique network identifier of the option controller via the internal bus.

15. The image forming apparatus according to claim 12, wherein the control information comprises at least one of settings of a double-sided print process, settings of a combined print process, settings of a finisher, settings of a paper feeding source, or a paper discharge destination.

16. An image forming method, comprising:
printing, via a print engine, an image based on raster image data;
executing, via a main controller, a process that depends on the print engine; and
via a relay unit, receiving the raster image data from an option controller that generates the raster image data, storing the raster image data in a memory, receiving a control command based on a result of the process that depends on the print engine from the main controller, reading the raster image data from the memory in accordance with the control command, and supplying the read raster image data to the print engine.

17. The method of claim 16, further comprising:
performing, via an energy-saving controller, a power control of the main controller based on control information received from the option controller via a network interface.

18. The method of claim 17, wherein the network interface is a data communication unit complying with the Ethernet standard.

19. A non-transitory computer-readable recording medium having stored therein an image forming program to be executed in a computer of an image forming apparatus, the image forming program comprising:
a first program code for causing the computer to print an image based on raster image data;
a second program code for causing the computer to execute a process that depends on a print engine; and
a third program code for causing the computer to:
receive the raster image data from an option controller that generates the raster image data;
store the raster image data in a memory;
read the raster image data from the memory in accordance with a control command based on a result of the process that depends on the print engine; and
supply the read raster image data to the print engine.

20. The non-transitory computer-readable recording medium according to claim 19, the image forming program further comprising:
a fourth program code for causing the computer to perform a power control of the main controller based on control information received from the option controller via a network interface.

* * * * *